(Model.)
E. KEMPSHALL.
FASTENER FOR THE MEETING RAILS OF SASHES.
No. 294,787. Patented Mar. 11, 1884.
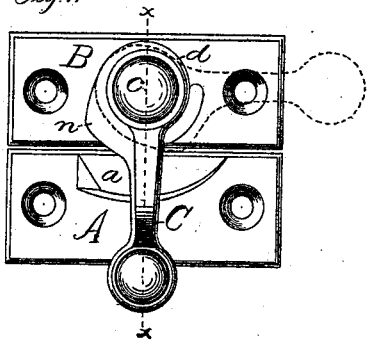
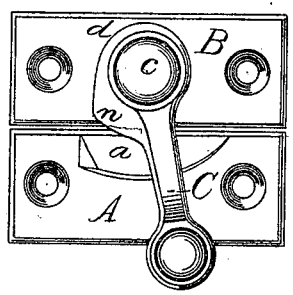
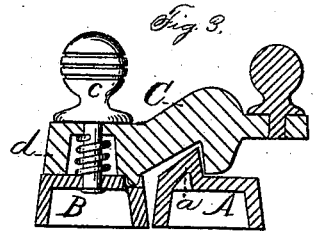
Witnesses.
John Edwards Jr.
Amos Shepard
Inventor.
Eleazer Kempshall.
By James Shepard
Atty

UNITED STATES PATENT OFFICE.

ELEAZER KEMPSHALL, OF NEW BRITAIN, CONNECTICUT.

FASTENER FOR THE MEETING-RAILS OF SASHES.

SPECIFICATION forming part of Letters Patent No. 294,787, dated March 11, 1884.

Application filed September 18, 1882. (Model.)

*To all whom it may concern:*

Be it known that I, ELEAZER KEMPSHALL, of New Britain, in the county of Hartford and State of Connecticut, have invented certain new and useful Improvements in Sash-Fasteners, of which the following is a specification.

My invention relates to improvements in sash-fasteners. In my improvement the hub of the swinging sweep or lever is provided with a cam upon one side thereof, and which extends across the meeting line of the middle sash-rails when the sweep is brought to the front for fastening the sash; and the objects of my invention are to prevent the sweep or lever from being forced around to unlock the sashes by means of a thin blade or instrument inserted between the meeting sash-rails, and also to so construct the cam that it will be locked against such an attempt even when the sweep or lever is brought only partly around to the front. I attain these objects by the simple mechanism illustrated in the accompanying drawings, in which—

Figure 1 is a plan view of my sash-fastener represented with the sweep as brought fully around to the front. Fig. 2 is a like view of the same, represented with the sweep as brought only partly around to the front; and Fig. 3 is a vertical section of my fastener on line $x\ x$ of Fig. 1.

The keeper-plate A, with its cam $a$, for drawing the two sash-rails together, may be of any ordinary construction. The same is true with reference to the sweep-plate B and the main portion of the sweep C. I place a friction-spring, $b$, around the pivotal post $c$ and within the hub $d$, for the purpose of making the sweep remain in whatever position it may be placed, the same as in many other prior sash-fasteners; and I prefer to embody my improvement in such a sash-fastener; but it may be embodied in other fasteners which employ a swinging sweep.

Upon one side of the hub $d$, I form an enlargement or cam, $n$, of such form that when the sweep is brought to the front one edge of the cam crosses the confronting edges of the plates A and B, and consequently it crosses the meeting line of the sash-rails and extends in an inclined direction, as shown in Fig. 1, the cam and its inclined edge being upon that side of the sweep that would be pushed upon in order to unlock the sashes. In case any attempt is then made to unlock the sashes by a thin instrument, the inclined edge will force that instrument toward the keeper-plate and cause the instrument to wedge so tightly in between the cam and the keeper-plate as to make it immovable. Sometimes the sash-rails swell, so that the ordinary cam for drawing them together will bind and prevent the sweep from being brought fully around to the front.

My sash-fastener is burglar-proof when the sweep is brought only partly around, provided it is carried far enough to carry the point of the cam $n$ by the confronting edges of the plates A B, as shown in Fig. 2. The broken lines in Fig. 1 indicate the position of the sweep when it is thrown fully around into position for unlocking, in which it will be seen that the cam is carried just far enough for that purpose.

I have herein shown my improvement as applied to that class of fasteners in which the sweep is pivoted to the rear plate for placing upon the lower rail of the upper sash; but it may be readily applied to that class in which the sweep is pivoted to the front plate for placing on the upper rail of the lower sash.

I am aware that a square shoulder has been formed on the lever or sweep of sash-fasteners at a point some little distance from the hub, for the purpose of preventing an instrument from slipping along the side of the sweep, and consequently to cause said instrument to bind against the keeper-plate in an attempt to unlock the fastener. Said sweep was pivoted within a box in connection with a spring, which bore upon faces at the end of the sweep to hold it in different positions. Sash-fasteners having such a shoulder on its sweep and a spring are hereby disclaimed. My sash-fastener is believed to differ from any in the prior art because the enlargement or cam is formed upon the hub of the sweep; because said cam will pass the meeting line of the sash-rails and lock the sash before the sweep reaches a position at right angles thereto; because the inclined edge of the cam stands obliquely to the length of the sweep; because the cam so completely covers the meeting line of the sash-rails that an instrument run in between the same upon the cam side of the sweep can never be brought into contact with the edge of the sweep; because the cam is in its burglar-proof position when the sweep stands at right angles to the sash-rails, and because the operative edge of the cam crosses the meeting line of the sash-rails when the sweep is at rest in its burglar-proof position.

I claim as my invention—

The improved sash-fastener, which consists of the respective plates and the pivoted sweep having the cam or enlargement upon its hub, the edge of which cam stands obliquely across the meeting line of the sash-rails when the sweep stands at a right angle thereto, substantially as described, and for the purpose specified.

ELEAZER KEMPSHALL.

Witnesses:
 JAMES SHEPARD,
 JOHN EDWARDS, Jr.